United States Patent [19]

Kuribayashi et al.

[11] Patent Number: 4,842,633
[45] Date of Patent: Jun. 27, 1989

[54] METHOD OF MANUFACTURING MOLDS FOR MOLDING OPTICAL GLASS ELEMENTS AND DIFFRACTION GRATINGS

[75] Inventors: Kiyoshi Kuribayashi, Neyagawa; Makoto Umetani, Hirakata; Hideto Monji, Katano; Masaki Aoki, Mino, all of Japan

[73] Assignee: Matsushita Electric Industrial Co., Ltd., Osaka, Japan

[21] Appl. No.: 235,301

[22] Filed: Aug. 23, 1988

[30] Foreign Application Priority Data

Aug. 25, 1987 [JP] Japan .................... 62-210432
Nov. 30, 1987 [JP] Japan .................... 62-302219

[51] Int. Cl.$^4$ .................... C03B 11/08; G02B 5/18
[52] U.S. Cl. .................... 65/44; 65/31; 65/37; 65/102; 156/638; 350/162.11; 350/162.22
[58] Field of Search ........ 65/44, 102, 37, 31; 350/162.11, 162.22; 156/638

[56] References Cited

U.S. PATENT DOCUMENTS

| | | | |
|---|---|---|---|
| 2,272,119 | 2/1942 | Jaeckel .................... | 65/37 |
| 3,530,010 | 9/1970 | Blakely .................... | 65/37 U X |
| 3,743,507 | 7/1973 | Chung/sen/ih et al. ...... | 350/162.22 |
| 4,227,769 | 10/1980 | Phillips et al. .................. | 350/162.22 |
| 4,654,119 | 3/1987 | Cook et al. .................... | 156/638 |
| 4,797,316 | 1/1989 | Hecq et al. .................... | 65/31 X |

FOREIGN PATENT DOCUMENTS

| | | | |
|---|---|---|---|
| 0009108 | 1/1983 | Japan .................... | 65/31 |
| 0097104 | 6/1984 | Japan .................... | 65/31 |
| 0017702 | 1/1987 | Japan .................... | 65/102 |

*Primary Examiner*—Arthur Kellogg
*Attorney, Agent, or Firm*—Wenderoth, Lind & Ponack

[57] ABSTRACT

A base material excellent in heat resistance and high-temperature strength is processed into a desired configuration. The processed base material is coated with a heat-resistant film having excellent strength at high temperatures and low reactivity with a glass material to be molded. A resist is applied on the heat resistant film and a desired pattern is drawn thereon by means of electron beam, ion beam, hologram exposure, or ordinary photolithography. Or if a mold having deep unevenness of the pressing surface is required, the resist is applied after an intermediate layer which permits selective etching is formed on the heat resistant film, and the required pattern is drawn thereon by means of electron beam, ion beam, hologram exposure, or ordinary photolithography. The intermediate layer is removed by wet etching or dry etching to emphasize unevenness of the mask. The resist film or the resist film and intermediate layer film are completely removed and a part of the heat-resistant film is removed to obtain a mold having the desired configuration of the molding surface.

6 Claims, 4 Drawing Sheets

FIG. I(a) 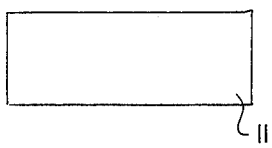
FIG. I(b) 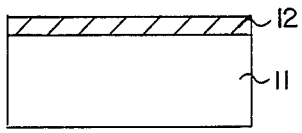
FIG. I(c) 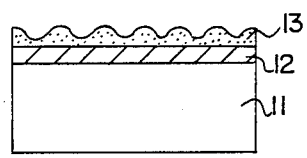
FIG. I(d) 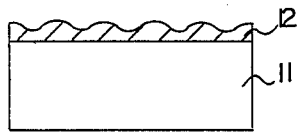

METHOD OF MANUFACTURING MOLDS FOR MOLDING OPTICAL GLASS ELEMENTS AND DIFFRACTION GRATINGS

BACKGROUND OF THE INVENTION

1. Field of the Invention

This invention relates to a method of manufacturing optical elements such as lens, diffraction gratings, and prisms having high-accuracy configuration and to molds for molding such elements.

2. Description of Conventional Examples

Conventional methods of manufacturing diffraction gratings are as follows: (1) An aluminum film formed on a glass substrate is processed by pressing by means of a superfine ruling engine into a matrix, the matrix is applied with a release agent and provided thereon with an aluminum film as a reflection film by vacuum deposition, a glass substrate is adhered to the aluminum film with an adhesive, and, after the adhesive has been cured, the glass substrate with the aluminum film adhered thereto is pealed off the matrix, thereby to obtain a replica diffraction grating. (2) A resist is applied on a glass substrate and subjected to hologram exposure to form a sinusoidal relief, and a reflection film is formed thereon to obtain a diffraction grating. (3) A glass substrate is coated with a resist having an etching rate higher than that of a mask resist, and the mask resist is formed thereon. Then, a relief grating which serves as a mask against ion beam is formed thereon, and an original board is produced by removal of the mask resist and a part of the resist under it by use of an ion beam. Then, after preparation of a matrix therefrom by electroforming, a replica diffraction grating is made by the same technique as in (1). (4) A matrix is formed by electron beam drawing to prepare elements by replica. (References: A Japanese article entitled "Variety of Techniques Applied to Resin Optical Parts for Realizing μm-Order 3-Dimensional Shapes", NIKKEI MECHANICAL June 17, 1985, pp. 85-94; A Japanese article entitled "Ion-Etched Blazed Holographic Zone Plates" by Y. Ono et al, papers of The 12th Micro Optics Seminar, pp. 6-10; Japanese Laid-Open Patent Application No. 59-65810/1984; A Japanese article entitled "Production of an Objective Lens for CD Using a Micro-Fresnel Lens", Extended Abstracts of The 33rd Spring Meeting, 1986, The Japan Society of Applied Physics and Related Societies, p. 113, 3a-H-3)

However, diffraction gratings prepared by the above methods always have a composition of a glass substrate, adhesive layer of resin, and a reflection layer, and are susceptible to temperature or humidity changes. In addition, the life of the matrix for preparing replica is unsatisfactory in view of mass production for supplying inexpensive diffraction gratings.

In micro-Fresnel lens preparation also, elements were made so far by carving in saw teeth gratings on an acrylic sheet one by one by machining, leading to only low properties of optical elements and to problems in properties of optical elements against temperature and humidity changes and in mass production properties. (Reference: A Japanese article entitled "Micro Optical Element for an Optical Disk", Extended Abstracts of The 33rd Spring Meeting, 1986, The Japan Society of Applied Physics and Related Societies, p. 121, 3p-A-8)

SUMMARY OF THE INVENTION

It is an object of the invention to provide a method of manufacturing optical glass elements having high configuration accuracy and good optical surface at low costs.

Another object of the invention is to provide a mold for press molding the optical glass elements.

According to the invention, (1) A base material of cemented carbide mainly comprising tungsten carbide or cermet is processed into a configuration corresponding to a desired final configuration.

(2) The processed base material is covered with a heat-resistant film having an excellent strength at high temperatures and a low reactivity with glass materials to be molded.

(3) A resist coating is applied on the heat resistant film and a desired pattern is drawn thereon by means of electron beam, ion beam, hologram exposure, or ordinary photolithography. Or if a mold having deep unevenness of the pressing surface is required, the resist coating is applied after an intermediate layer which permits selective etching is formed on the heat resistant film, and the required pattern is drawn thereon by means of electron beam, ion beam, hologram exposure, or ordinary photolithography.

(4) The intermediate layer is removed by wet etching or dry etching to emphasize unevenness of the mask.

(5) The resist film or the resist film and intermediate layer film are completely removed and a part of the heat-resistant film is removed to obtain a mold having the desired configuration of the molding surface.

The present invention further provides a method of manufacturing precision diffraction gratings stably and in high mass-productivity by press molding a bulk glass material to be molded after heating it above the softening point, using a mold for molding diffraction grating prepared by the above method. The thus prepared diffraction grating has an advantage that its optical characteristics are stable against temperature and humidity changes since it contains no resin layer between the glass substrate and reflection film, having the reflection film directly formed on the uneven glass substrate, unlike the diffraction grating prepared by the conventional methods.

BRIEF DESCRIPTION OF THE DRAWINGS

FIG. 1 is a process diagram in section showing the preparation of a mold for molding optical elements according to the invention.

DETAILED DESCRIPTION OF THE INVENTION

Figure 2A:
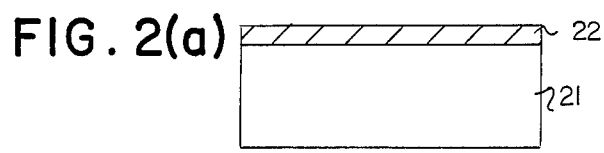
FIG. 2 is a process diagram in section showing the preparation process of a mold for molding the saw-teeth diffraction grating having a large unevenness of the molding surface.
Figure 2B:
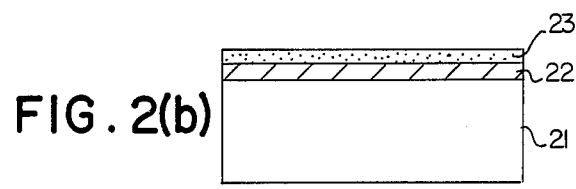
Figure 2C:
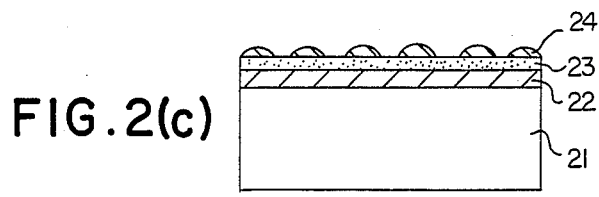
Figure 2D:
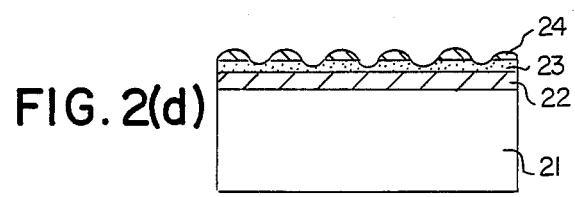
Figure 2E:
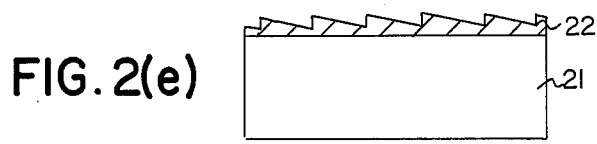
Figure 3A:
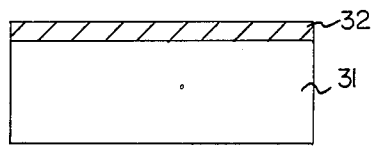
FIG. 3 is a process diagram in section showing the preparation of a mold for molding the Fourier grating having a grating constant of 0.8 μm and unevenness of molding surface of 0.5 μm.
Figure 3B:
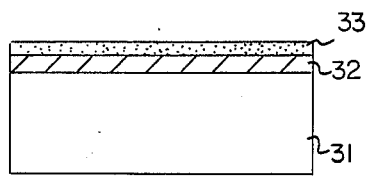
Figure 3C:
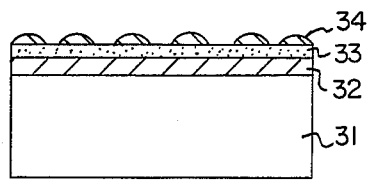
Figure 3D:
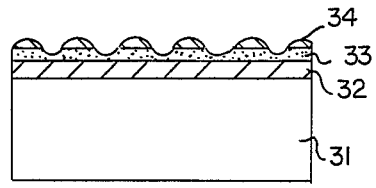
Figure 3E:
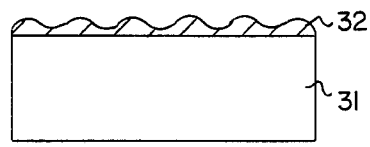

The following Examples illustrate in detail the process of manufacturing the mold for molding optical glass elements and the diffraction grating according to the invention with reference to the drawings:

Example 1

FIG. 1 shows the process of manufacturing a mold for molding optical glass elements according to the invention. The surface of a cemented carbide substrate comprising about 85% by weight tungsten carbide (WC), about 12% by weight cobalt (Co), and other constituents, and being 5 cm long×5 cm wide and 2 cm thick is finished by mirror grinding into a surface roughness of RMS 8 to 12 Å as a base material 11 for optical element molding mold, as shown in FIG. 1-(a). Then, on the base material is formed a noble metal alloy film comprising about 30% by weight platinum (Pt) and about 70% by weight iridium (Ir) by sputtering as a heat resistant film 12 having poor reactivity with the glass material, as shown in FIG. 1-(b). Thereafter, a novolak series resist 13 (made by Shipley Co.) is coated on the noble metal alloy film and hologram-exposed to form sinusoidal unevenness of a grating constant of 0.8 $\mu$m, as shown in FIG. 1-(c). To determine the optimum etching time, the etching rates of the noble metal alloy film and the novolak series resist are measured in advance, and all the resist film 13 and a part of the noble metal alloy film 12 are removed from the sample shown in FIG. 1-(c) by ECR (Electron Cyclotron Resonance) plasma etching to prepare a press-molding mold of sinusoidal diffraction grating having a grating constant of 0.8 $\mu$m and a press surface unevenness of 0.2 $\mu$m, as shown in FIG. 1-(d). The ECR plasma etching conditions of this Example are Ar gas pressure of $3 \times 10^{-4}$ Toor, microwave power of: 400 W, and ion drawing-out voltage of 400 V. Since a heat resistant film having poor reactivity with glass is directly formed on the heat resistant base material, the mold prepared by the above process is stabilized as a mold for molding optical elements and has a composition which insures long service life.

In this Example, the base material is made of a cemented carbide mainly composed of tungsten carbide (WC), but the matrix is not limited to the cemented carbide. Any cermets having excellent heat resistance, and mainly composed of such a material as titanium nitride (TiN), titanium carbide (TiC), chromium carbide ($Cr_3C_2$), or aluminum oxide ($Al_2O_3$) can be used. Also, the heat resistant film is not limited to Pt-Ir alloy as in this Example, but those composed mainly of platinum metals such as Pt, Rh, Ir, and Ru, or of osmium alloy, carbide, nitride, or boride can also be used.

Example 2

A second example is described with reference to FIG. 2. This example aims at obtaining a diffraction grating having deeper unevenness on the press surface. The surface of a cermet substrate comprising main constituent of chromium carbide ($Cr_3C_2$) and being 5 cm long×5 cm wide and 2 cm thick is finished by mirror grinding into a surface roughness of RMS 14–18 Å as a base material 21 for optical element molding tool, as shown in FIG. 2-(a). Then, on the base material is formed a heat-resistant film 22 of aluminum nitride (AlN) having low reactivity with the glass material, by ion plating, as shown in FIG. 2-(b). Here, the etching rates of the heat resistant film 22, an intermediate layer 23, and a mask resist 24 are measured and the thickness of the intermediate layer and the optimum etching time are determined in advance. An intermediate layer 23 of silicon oxide ($SiO_2$) film is provided by sputtering method to a thickness of 7000 Å, as shown in FIG. 2-(c), so that the unevenness on the mold press surface attains a desired depth (1 $\mu$m in this Example). Then, after forming a resist 24 (made by Höchst Co.) on the intermediate layer 23, a desired configuration pattern is provided by photolithography, as shown in FIG. 2-(d). Thereafter, the intermediate layer 23 is subjected to anisotropic etching by reactive ion etching (RIE) using $CHF_3/G_2F_6$ gas to emphasize the unevenness on the press surface as shown in FIG. 2-(e). Finally, an ion beam etching is an oblique direction removes all the resist and intermediate layer and a part of the heat-resistant film to obtain a mold of saw teeth diffraction grating having a grating constant 1.3 $\mu$m and unevenness about 1 $\mu$m.

It became possible to make the unevenness of the press surface up to 1 $\mu$m by controlling the thickness of the intermediate layer as used in this Example.

The intermediate layer is not limited to $SiO_2$ as used in this Example but alloys of silica (Si), aluminum (Al), or aluminum can also be used.

Example 3

A third example is described with reference to FIG. 3. This Example aims at obtaining a Fourier grating having a press-surface unevenness of 0.5 $\mu$m and a grating constant of 0.8 $\mu$m. The surface of a cemented carbide substrate comprising about 85% by weight tungsten carbide (WC) and about 12% by weight cobalt (Co), and residuals, having a size of 5 cm long, 5 cm wide, and 2 cm thick is finished by mirror grinding to a surface roughness RMS=8–12 Å into a base material 31 of a mold for molding optical elements, as shown in FIG. 3-(a). Then, on the base material, a heat-resistant film 32 of boron nitride (BN) having poor reactivity with the glass material is formed by ion plating, as shown in FIG. 3-(b). Here, the etching rates of the heat-resistant film 32, an intermediate layer 33, and a mask resist 34 are determined in advance, and a copper (Cu) film is applied as an intermediate layer 33 on the heat-resistant film 32 to a thickness of about 0.3 $\mu$m by sputtering so that the unevenness of the press surface attains desired depth to emphasize the unevenness of the press surface, as shown in FIG. 3-(c). Then, a resist 34 (made by Tokyo Applied Chemistry Co.) is applied on the intermediate layer 33 and formed into a desired pattern by exposure to electron beam, as shown in FIG. 3-(d). Thereafter, the copper in the intermediate layer is removed by wet etching to emphasize the unevenness, as shown in FIG. 3-(e). Then, all the resist and intermediate layer and a part of the heat-resistant layer are removed from the specimen by ECR plasma etching to complete the mold for molding the Fourier diffraction grating, as shown in FIG. 3-(f).

The intermediate layer is not limited to copper (Cu) as used in this Example, but aluminum (Al), nickel (Ni), etc. can also be used.

In Examples 1, 2, and 3, description was made on the molds for molding diffraction gratings having a sinusoidal or saw-teeth like optical surface. However, this invention can certainly be applied also to the molds for molding such as micro-Fresnel lens and high-precision aspherical lens.

Example 4

Figure 4:
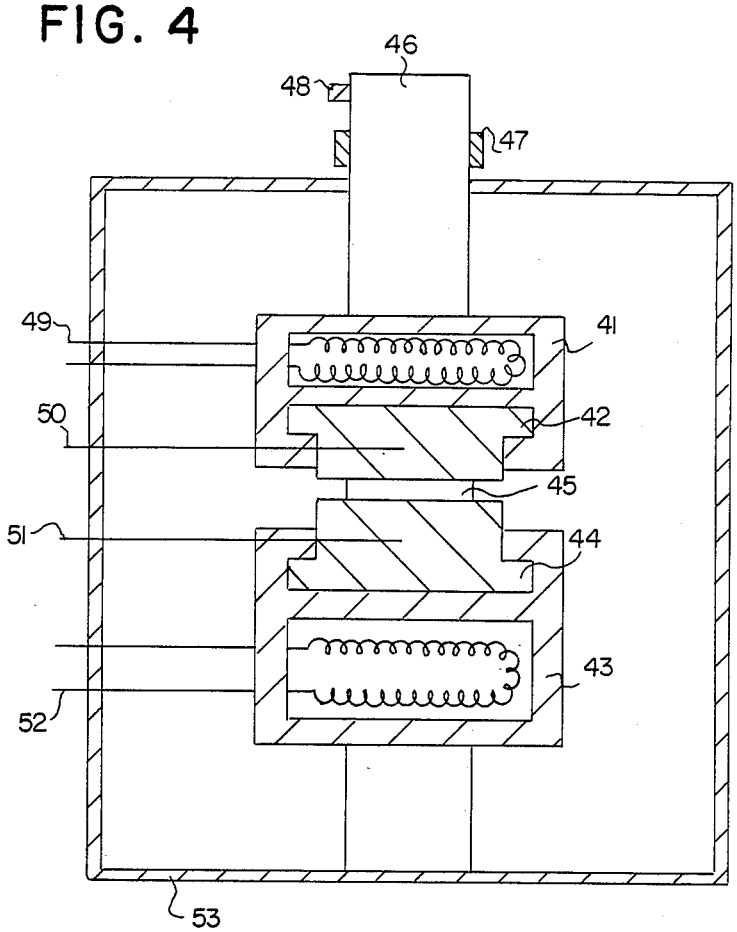
FIG. 4 is a schematic elevation showing a mold machine incorporating the press-molding mold of the diffraction grating according to the invention.

A pair of upper mold 42 and lower mold 44 for molding Fourier gratings prepared by the method described in Example 3 are set to an upper mold block 41 and a lower mold block 43, respectively, of a pressing machine, shown in FIG. 4. After placing a piece of SK 14 glass 45 on the lower mold 44, the upper and lower molds are heated with heaters 49 and 52 in nitrogen atmosphere at 740° C. After confirming that the upper and lower mold temperature has reached 740° C. with thermocouples 50 and 51, the upper mold 42 is pressed down by a plunger 46 to effect press molding at a pressure of 50 kg/cm². Here, the thickness of the diffraction grating is controlled by regulating the movable distance of the plunger with a stopper 47 and a positioning sensor 48. After holding the mold pressed for 20 sec, the upper and lower molds, as they are, are allowed to cool down to 400° C., and thereafter the press molded optical element is taken out. A reflection Fourier grating is prepared by coating the molded glass surface with Au—Cr alloy reflection film. Such process was repeated many times for checking the manufacturing stability of the optical elements prepared by the press molding. All the 300 Fourier gratings thus prepared showed a diffraction efficiency of about 85% on the E-wave and 80% on the H-wave at 0.8 μm zone. Thus, the method of manufacturing optical elements according to the invention permits stabilized production of high-efficiency reflection Fourier gratings.

In this Example, the method of manufacturing only the Fourier gratings, has been described, but it is not limited to Fourier gratings and can be applied to diffraction gratings having various configurations.

As described so far, the present invention makes it possible to manufacture high-precision optical elements stably at low costs.

What is claimed is:

1. A method of manufacturing a diffraction grating characterized by using a pair of molds, a molding surface of at least one of the molds having a relief corresponding to the diffraction grating, heating a glass material to be molded to a temperature higher than its softening point in an inert gas atmosphere, and pressure molding the glass material to transfer the shapes of the molding surfaces of the molds onto the glass material to be molded, thereby to obtain the diffraction grating.

2. A method as claimed in claim 1, wherein each of the molds is obtained by: mirror grinding a base material of a material excellent in heat resistance and high-temperature strength; either coating the base material with a heat-resistant film low in reactivity with the glass material to be molded and excellent in high-temperature strength and forming a desired pattern of a resist on said heat-resistant film, or forming on said heat resistant film an intermediate layer susceptible to etching followed by forming on said intermediate layer a desired pattern of a resist and removing a part of the intermediate layer by wet etching or dry etching; and removing all of the resist and the intermediate layer and a part of the heat resistant film by dry etching thereby to obtain the molding surface having the relief corresponding to the diffraction grating.

3. A method of manufacturing a mold for molding optical glass elements comprising the steps of: processing a base material which is excellent in heat resistance and high-temperature strength into a desired configuration; either coating the base material with a heat-resistant film low in reactivity with a glass material to be molded and forming a desired pattern of a resist on said heat-resistant film, or coating said heat-resistant film with an intermediate layer susceptible to etching followed by forming on said intermediate layer a desired pattern of a resist and removing a part of the intermediate layer by wet etching or dry etching; and removing all of the resist and the intermediate layer and a part of the heat resistant film by dry etching thereby to form a molding surface of the mold into a desired configuration.

4. A method as claimed in claim 3, wherein said base material comprises a cemented carbide mainly comprising tungsten carbide (WC), a cermet mainly comprising titanium nitride (TiN), a cermet mainly comprising titanium carbide (TiC), a cermet mainly comprising chromium carbide, or a cermet mainly comprising aluminum oxide ($Al_2O_3$).

5. A method as claimed in claim 3, wherein said heat resistant film comprises a platinum group metal or an alloy, nitride, carbide, or boride.

6. A method as claimed in claim 3, wherein said intermediate layer comprises aluminum (Al), an aluminum alloy, copper (Cu), nickel (Ni), silicon (Si), or silicon oxide ($SiO_2$).

* * * * *